United States Patent
Hucks et al.

(10) Patent No.: US 6,835,797 B2
(45) Date of Patent: Dec. 28, 2004

(54) PROCESS FOR PRODUCING OLIGOCARBONATES

(75) Inventors: Uwe Hucks, Alpen (DE); Rolf Bachmann, Bergisch Gladbach (DE); Franz Ferdinand Rhiel, Dormagen (DE); Thomas Fischer, Krefeld (DE); Silke Kratschmer, Krefeld (DE)

(73) Assignee: Bayer Aktiengesellschaft, Leverkusen (DE)

(*) Notice: Subject to any disclaimer, the term of this patent is extended or adjusted under 35 U.S.C. 154(b) by 171 days.

(21) Appl. No.: 10/103,921

(22) Filed: Mar. 22, 2002

(65) Prior Publication Data

US 2002/0137874 A1 Sep. 26, 2002

(30) Foreign Application Priority Data

Mar. 26, 2001 (DE) .......................... 101 14 808

(51) Int. Cl.[7] .............................. C08G 64/00
(52) U.S. Cl. .................. 528/196; 422/131; 528/198
(58) Field of Search .................... 422/131; 528/196, 528/198

(56) References Cited

U.S. PATENT DOCUMENTS

| | | | |
|---|---|---|---|
| 3,022,272 A | 2/1962 | Schnell et al. ............... 260/47 |
| 5,340,905 A | 8/1994 | Kuhling et al. ............. 528/199 |
| 5,399,659 A | 3/1995 | Kuhling et al. ............. 528/199 |
| 5,416,186 A | 5/1995 | Oshino et al. .............. 528/198 |
| 5,498,688 A | 3/1996 | Oshino et al. .............. 528/198 |
| 5,648,437 A | 7/1997 | Fischer et al. ............... 526/64 |
| 5,912,289 A | 6/1999 | Komiya et al. ............. 524/153 |
| 5,912,318 A | 6/1999 | Hasegawa et al. .......... 528/196 |
| 5,932,683 A | 8/1999 | Hachiya et al. ............ 528/196 |
| 6,339,138 B1 | 1/2002 | van Hout et al. ........... 528/196 |

FOREIGN PATENT DOCUMENTS

| | | |
|---|---|---|
| DE | 1 031 512 | 6/1958 |
| EP | 0 710 687 | 5/1996 |

OTHER PUBLICATIONS

Polymer Reviews; vol. 9; Chemistry and Physics of Polycarbonates pp. 44–51 month unavailable 1964.

*Primary Examiner*—Terressa M. Boykin
(74) *Attorney, Agent, or Firm*—Joseph C. Gil; Aron Preis

(57) ABSTRACT

A continuous process for producing oligocarbonate is disclosed. The process entails in sequence the steps of a) reacting a dihydroxyaryl compound with a diaryl carbonate in the presence of a catalyst to obtain a melt and avoiding removal of released monohydroxyaryl compound and b) withdrawing the monohydroxyaryl compound by flash evaporation and c) heating the melt obtained under vacuum in an evaporator equipped with sump receiver and d) repeating at least once steps b) and then c) each at gradually increased temperatures and lowered pressures.

10 Claims, No Drawings

PROCESS FOR PRODUCING OLIGOCARBONATES

FIELD OF THE INVENTION

This application relates to a continuous process for producing oligocarbonates by the melt transesterification process.

SUMMARY OF THE INVENTION

A continuous process for producing oligocarbonate is disclosed. The process entails in sequence the steps of a) reacting a dihydroxyaryl compound with a diaryl carbonate in the presence of a catalyst to obtain a melt and avoiding removal of released monohydroxyaryl compound and b) withdrawing the monohydroxyaryl compound by flash evaporation and c) heating the melt obtained under vacuum in an evaporator equipped with sump receiver and d) repeating at least once steps b) and then c) each at gradually increased temperatures and lowered pressures.

BACKGROUND OF THE INVENTION

Oligocarbonates constitute the first step in the production of polycarbonates and are obtainable from dihydroxyaryl compounds and diaryl carbonates in the presence of one or more catalysts. The oligocarbonates have weight-average molecular weights (Mw) of 3,000 to 20,000, preferably 3,000 to 15,000 and are condensed to form polycondensates having molecular weights Mw of 15,000 to 40,000.

The production of oligocarbonates by the melt transesterification process is known in principle. A discontinuous process is described, for example, in DE-A 4 312 390. Further details of the melt transesterification process are described in the literature (see, for example, Hermann Schnell, Chemistry and Physics of Polycarbonates, Polymer Reviews, Vol. 9, 1964, pages 44 to 51, DE-A 1 031 512, U.S. Pat. No. 3,022,272, U.S. Pat. No. 5,340,905 and U.S. Pat. No. 5,399,659).

Regarding continuous techniques, several reaction vessels are generally used for the formation of oligocarbonates; these reaction vessels are operated batchwise in alternation, in order subsequently to obtain a continuous flow of product. This process is described, for example, in U.S. Pat. No. 5,912,318, U.S. Pat. No. 5,932,683, U.S. Pat. No. 5,912,289, WO 00/26 276 or EP-A 620 240. This procedure has the disadvantage, however, that the batch-operated vessels have long residence times of 1 to 20 hours and lead to oligomers of varying quality which have an adverse effect during the polycondensation. In addition, the temperature or the vacuum in the vessels, such as, for example, in EP-A 620 240, is slowly increased with each batch in order to remove released monohydroxyaryl compound. This requires additional time and energy, as the vessel has to be re-cooled for the next batch. Moreover, a scale-up of the agitated tanks rapidly comes up against limiting factors, because the available mass-transfer surface area in proportion to the volume steadily becomes less.

Consequently, the object of the present invention was to find a process for producing oligocarbonates which can be operated continuously and renders possible a better heat input and shorter residence times in the reaction chamber.

DETAILED DESCRIPTION OF THE INVENTION

Surprisingly, this object was achieved by a process for producing oligocarbonates from dihydroxyaryl compounds and diaryl carbonates in the presence of catalysts, characterised in that, in a continuous procedure
a) the dihydroxyaryl compound is first of all reacted with the diaryl carbonate without removal of the released monohydroxyaryl compound and
b) the monohydroxyaryl compound is then removed by flash evaporation and
c) the melt obtained is then heated under vacuum in an evaporator with sump receiver and
d) corresponding to b) and c), in several successive runs the temperature is gradually increased and the pressure is gradually lowered.

To carry out the process, either the co-reactants are melted together or else the solid dihydroxyaryl compound is dissolved in the diaryl carbonate melt or the solid diaryl carbonate is dissolved in the dihydroxyaryl compound melt or both raw materials are brought together in the form of melt, preferably directly from their production. The residence times of the separated melts of the raw materials, in particular those of the dihydroxyaryl compound melt, are adjusted so as to be as short as possible. The mixed melts could even for longer residence times be held at lower temperatures than the raw materials, based on the reduced melting point of the mixture compared with the separate raw materials, without being damaged. Subsequently a catalyst, dissolved in monohydroxy aryl compound, is admixed and the melt is heated to the reaction temperature. At the beginning of the technically important process to produce polycarbonate from Bisphenol A and diphenyl carbonate this is 180 to 220° C., preferably 190 to 210° C. and particularly preferably 190 to 200° C. The reaction equilibrium is established at residence times of 15 to 90 minutes, preferably 30 to 60 minutes, without removing the released monohydroxyaryl compound. The reaction may be carried out at atmospheric pressure, but for technical reasons may also be carried out at excess pressure. The preferred pressure in industrial plants is 2 to 12 bar.

The melt mixture is expanded in a first vacuum chamber, the pressure of which is adjusted to 100 to 400 mbar, preferably 150 to 300 mbar, and immediately afterwards is reheated to the inlet temperature at the same pressure in a suitable device. During this Expansion the released monohydroxyaryl compound is evaporated in admixture with remaining monomer compounds.

After a residence time of 5 to 45 minutes and preferably 5 to 30 minutes in a receiver, optionally using a circulating pump device, at unchanged pressure and temperature, the reaction mixture is expanded in a second vacuum chamber, the pressure of which is 50 to 200 mbar, preferably 80 to 150 mbar, and immediately afterwards is heated to a temperature of 190 to 250° C., preferably to 210 to 240° C., particularly preferably 210 to 230° C., at the same pressure in a suitable device. During this expansion again the released monohydroxyaryl compound is evaporated in admixture with remaining monomer compounds.

After a residence time of 5 to 45 minutes and preferably 5 to 30 minutes in a receiver, optionally using a circulating pump device, at unchanged pressure and temperature, the reaction mixture is expanded in a third vacuum chamber, the pressure of which is 30 to 150 mbar, preferably 50 to 120 mbar, and immediately afterwards is heated to a temperature of 220 to 280° C., preferably 240 to 270° C., particularly preferably 240 to 260° C., at the same pressure in a suitable device. During this expansion again the released monohydroxyaryl compound is evaporated in admixture with remaining monomer compounds.

After a residence time of 5 to 30 minutes and preferably 5 to 20 minutes in a receiver, optionally using a circulating pump device, at unchanged pressure and temperature, the reaction mixture is expanded in a further vacuum chamber, the pressure of which is 5 to 100 mbar, preferably 15 to 100 mbar, particularly preferably 20 to 80 mbar, and immediately afterwards is heated to a temperature of 250 to 300° C., preferably 260 to 290° C., particularly preferably 260 to 280° C., at the same pressure in a suitable device. During this expansion again the released monohydroxyaryl compound is evaporated in admixture with remaining monomer compounds.

The oligomers thus obtained may after a residence time of 5 to 30 minutes, preferably 5 to 20 minutes, be further polycondensed.

The number of these steps—here, for example, 4—may vary between 2 and 6 and preferably are 3 or 4. The residence times, temperatures and pressures given are likewise only to be regarded as examples and may be accommodated to the number of steps or to the intended viscosity, the temperature and pressure may be varied but kept between 180 and 300° C., respectively between 400 and 5 mbar in all steps. The relative viscosity of the oligomer achieved in these steps is between 1.03 and 1.20, preferably between 1.06 and 1.15, preferably between 1.06 and 1.10. The relative viscosity is determined as the quotient of the viscosity of the solvent and of the viscosity of the polymer dissolved in this solvent. It was determined at 25° C. in dichloromethane at a concentration of 5 g/l.

The oligomer thus produced may be condensed to form higher molecular polycarbonates in known reactor devices with further elevation of the temperature and lowered pressures, optionally after addition of further catalysts.

It is also particularly advantageous that the production of polycarbonates can be carried out in locations which do not have a typical infrastructure for the construction of chemical plants. For this purpose the oligocarbonate is melted in suitable apparatuses, such as for example extruders, and, optionally after adding monomers for correcting the molar ratio as well as possibly catalysts, is delivered to suitable polycondensation apparatuses and condensed. The quantities of monohydroxyaryl compounds to be cleaved are small and are therefore unproblematical. The production of the raw materials, which usually has a high environmental risk potential due to, for example, chlorine, carbon monoxide, phosgene, halogenated solvents, effluents and high quantities of monohydroxyaryl compounds, can be carried out in other locations.

The apparatus and reactors suitable for the individual steps of the process, corresponding to the order of procedure, are heat exchangers, apparatus or agitated tanks, which provide the required residence time at constant temperature; expansion apparatus, such as large tanks, separators or cyclones; agitated tanks, circulation evaporators, falling-film evaporators or other purchasable apparatus, which enable the necessary heat input to be attained and containers which ensure the required residence times after the heating of the reaction melt.

The piping connecting the apparatus should, of course, be as short as possible and the bends in the piping should be as slight as possible. In this connection, the conditions created by the outer framework of the construction of the plant must be taken into account.

Particularly suitable materials for the production of the apparatuses, reactors, pipelines, pumps and fittings are stainless steels of type Cr Ni (Mo) 18/10, such as for example 1.4571 or 1.4541 (Stahlschlüssel 2001, Verlag: Stahischl üssel Wegst GmbH, Th-Heuss-Straβe 36, D-71672 Marbach) and Ni base alloys of type C, such as for example 2.4605 or 2.4610 (Stahlschlüssel 2001, Verlag: Stahlschl üssel Wegst GmbH, Th-Heuss-Straβe 36, D-71672 Marbach). The stainless steels are used at process temperatures of up to about 290° C. and the Ni base alloys at process temperatures of higher than about 290° C.

The process is preferably carried out using a conventional heat exchanger to heat the melt containing the raw materials. A perforated-plate column is used as a detention tank for the establishment of the reaction equilibrium. The perforated-plate column is a vertically arranged pipe of large diameter, in which perforated plates containing one or more holes are disposed at regular intervals. The free surface area of the hole or holes in the plate in proportion to the total surface area of the perforated plate is so chosen that a back-mixing in the reaction melt is avoided owing to a sufficiently high flow rate through the hole or holes. These features ensure a cascading mode of operation in the perforated-plate column and minimize the residence time, thus providing a procedure which is protective of the product.

The expansion processes, that is, the flash evaporations, are carried out in separator tanks, preferably in cyclones, centrifugal separators or baffle separators, which are at an absolute pressure which is lower than in the preliminary stage. The phenol vapors arising are led away by means of a pressure control. The separated liquid is led away into a falling-film evaporator. The cyclones, centrifugal separators or baffle separators are preferably separated hydraulically from the falling-film evaporator with sump receiver. The even distribution to the downpipes is achieved by means of a liquid distributor, which must be so designed geometrically and in view of fluid dynamics that it does not contain any regions providing long residence times for the melt, i.e. the distribution takes place preferably above the falling-film evaporators in distributors which in view of fluid dynamics are free from dead spaces. In the falling-film evaporators, heat is introduced in order to raise the temperature of the melt. The falling-film evaporator includes one or more pipes, around which the heating medium flows. The melt flows downwards inside the pipes and is collected in a tempered sump receiver. The selected pipe diameters are 25 to 150 mm, preferably 50 to 100 mm. The pipe lengths are 4 to 20 m, preferably 8 to 16 m. In order to improve the film flow and to increase the surface area and the content of product in the pipe, it is advantageous to use spiral pipes instead of smooth pipes. The melt collected in the receiver is passed to the following reaction step after a residence time of 5 to 30 minutes. In order to thoroughly mix the melt in the receiver, it is useful to return a substream of the melt, which is conveyed to the next step. Here it is particularly advantageous to return the melt coming out of the falling film evaporator and the circulating pump device via a distributor, which consists of a lattice construction or packed column in order to increase the surface area in the upper part of the receiver prior to the inflow into the bottom of the receiver. This lattice construction design is advantageously in the form of a structure with vertical perforated plates, down which the melt flows. The perforations in the plates are advantageously designed in the form of circles, triangles, squares, longitudinal rectangles or hexagons. Hexagons are a particularly advantageous choice. The diameter of the perforations, which is defined as the diameter D of a circle of an equivalent area, should advantageously correspond to the following formula $D = x(\eta^2 l(\text{kg}^2 \, \text{m}^{-5} \text{s}^{-2}))^{1/3}$, wherein η is the melt viscosity in Pa.s. The non-dimensional factor x is preferably varied between 0.009 and 0.21, more preferably between 0.013 and 0.11, and most preferably between 0.017 and 0.07. The ratio between the free area and the total area should advantageously be between 0.5 and 0.95, and particularly advantageously between 0.7 and 0.9. The perforated plates can be geometrically arranged for example in the form of one or more concentric cylinders, or in parallel or radially. They are preferably arranged in the form of cylinders or radially. Distribution advantageously takes place with the aid of distributors which are free of dead spaces with regard to flow. The load per length can be varied within wide ranges: between 0.05 and 5 m$^3$/(m*h), preferably between 0.1 and 4 m$^3$/(m*h) and more preferably between 0.5 and 3 m$^3$/(m*h).

The number of flash evaporators and falling-film evaporators is 2 to 6, preferably 3 or 4. It was found that the number has a definite influence on the excess of diary carbonate which is always necessary during melt transesterification. Where the raw materials used are bisphenol A and diphenyl carbonate, the excess is 2 to 30 mol. %, preferably 4 to 25 mol. %, particularly preferably 6 to 22 mol. %, very particularly preferably 6 to 20 mol. %, and also depends on the content of OH end groups which is to be obtained in the polycarbonate to be produced from this oligocarbonate. The values may then be different if a correction to the content of OH end groups is to be made by a subsequent addition of diaryl carbonates or dihydroxyaryl compounds.

The vapors of phenol together with diaryl carbonates which are obtained from the flash evaporation and falling-film evaporation steps by means of the pressure controls, and are invariably partially vaporized owing to the equilibrium reaction and the thermodynamic data, as well as of other compounds, which are formed from the starting materials, the catalyst and the oligomers by secondary reactions and decomposition reactions, as well as impurities from the starting materials, catalyst decomposition products, oligomers, etc., are advantageously passed into a distillation column without condensation in heat exchangers, in order to isolate phenol as pure material at the top. By suitably selecting the operating variables of the column, one may achieve phenol of a quality which renders possible its direct use in the synthesis of bisphenol A or of diphenyl carbonate. This is necessary and reasonable on environmental and economic grounds.

It is known that the melt transesterification process commences from dihydroxy aryl compounds, diary carbonate and optionally branching agents and/or monohydroxyaryl compounds.

Suitable dihydroxyaryl compounds for the process according to the invention are those corresponding to formula (I)

HO-Z-OH                                                          (I)

wherein Z is an aromatic group having 6 to 30 C atoms, preferably 6 to 25 C atoms, which may contain one or more aromatic nuclei, may be substituted and may contain aliphatic or cycloaliphatic groups or alkylaryls or hetero atoms as bridge-type crosslinks.

Examples of dihydroxyaryl compounds corresponding to formula (I) are
hydroquinone,
resorcinol,
dihydroxydiphenyls,
bis(hydroxyphenyl)alkanes,
bis(hydroxyphenyl)cycloalkanes,
bis(hydroxyphenyl)sulfides,
bis(hydroxyphenyl)ethers,
bis(hydroxyphenyl)ketones,
bis(hydroxyphenyl)sulfones,
bis(hydroxyphenyl)sulfoxides,
α,α'-bis(hydroxyphenyl)diisopropylbenzenes and their ring-alkylated and ring-halogenated compounds.

These and other suitable dihydroxyaryl compounds are described, for example, in U.S. Pat. Nos. 3,028,365, 3,148,172, 3,275,601, 2,991,273, 3,271,367, 3,062,781, 2,970,131 and 2,999,846, in DE-A 1 570 703, 2 063 050, 2 063 052, 2 211 0956, in the French Patent 1 561 518 and in the monograph by H. Schnell, "Chemistry and Physics of Polycarbonates", Interscience Publishers, New York, 1964.

Preferred dihydroxyaryl compounds are, for example:
4,4'-dihydroxydiphenyl,
2,2-bis(4-hydroxyphenyl)propane,
2,4-bis(4-hydroxyphenyl)-2-methylbutane,
1,1-bis(4-hydroxyphenyl)cyclohexane,
1,1-bis(4-hydroxyphenyl)4-methylcyclohexane,
α,α'-bis(4-hydroxyphenyl)-p-diisopropylbenzene,
α,α'-bis(4-hydroxyphenyl)-m-diisopropylbenzene,
1,3-bis[2-(4-hydroxyphenyl)isopropyl]benzene,
1,4-bis[2-(4-hydroxyphenyl)isopropyl]benzene,
bis(4-hydroxyphenyl)sulfone,
bis(4-hydroxyphenyl)methane,
1-bis(4-hydroxyphenyl)-3,3,5-trimethylcyclohexane,
bis(2,6-dimethyl-4-hydroxyphenyl)propane,
bis(4-hydroxyphenyl)hexafluoropropane,
bis(4-hydroxyphenyl)-1-phenylethane,
bis(4-hydroxyphenyl)diphenylmethane,
dihydroxydiphenyl ether,
4,4'-thiobisphenol,
bis(4-hydroxyphenyl)-1-(1-naphthyl)ethane,
bis(4-hydroxyphenyl)-1-(2-naphthyl)ethane,
dihydroxy-3-(4-hydroxyphenyl 1,1,3-trimethyl-1H-inden-5-ol,
dihydroxy-1-(4-hydroxyphenyl)-1,3,3-trimethyl-1H-inden-5-ol,
2,2',3,3'-tetrahydro-3,3,3',3'-tetramethyl-1,1'-spirobi[1H-inden]-5,5'-diol.

The following are particularly preferred:
resorcinol,
bis(4-hydroxyphenyl)-1-(1-naphthyl)ethane,
bis(4-hydroxyphenyl)-1-(2-naphthyl)ethane,
2,2-bis(4-hydroxyphenyl)propane,
α,α'-bis(4-hydroxyphenyl)-p-disopropylbenzene,
α,α'-bis(4-hydroxyphenyl-m-diisopropylbenzene,
1,3-bis[2-(4-hydroxyphenyl)isopropyl]benzene,
1,4-bis[2-(4-hydroxyphenyl)isopropyl]benzene,
1,1-bis(4-hydroxyphenyl)cyclohexane,
bis(4-hydroxyphenyl)-3,3,5-trimethylcyclohexane,
bis(4-hydroxyphenyl)diphenylmethane.

The following are most preferred:
bis(4-hydroxyphenyl)-3,3,5-trimethylcyclohexane,
4,4'-dihydroxydiphenyl,
2,2-bis(4-hydroxyphenyl)propane.

A dihydroxyaryl compound corresponding to formula (I) may be used, with formation of homooligocarbonates, or several dihydroxyaryl compounds corresponding to formula (I) may be used, with formation of cooligocarbonates.

Dihydroxaryl compounds may also be used containing residual amounts of their precursor monohydroxyaryl compounds. These amounts may be up to 20% preferably 10% particularly preferably 5% and very particularly preferably up to 2%. All percentages are given as percent by weight.

Diaryl carbonates, for the purpose of the present invention, are those diaryl esters corresponding to formula (II)

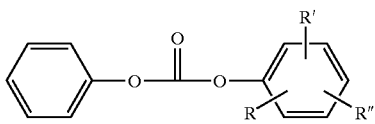

and formula (III),

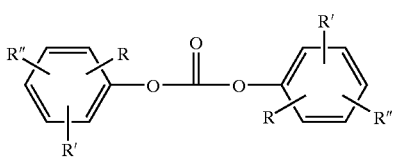

wherein R, R' and R", independently of one another denote H, optionally branched $C_1$–$C_{34}$-alkyl/cycloalkyl, $C_7$–$C_{34}$-alkaryl or $C_6$–$C_{34}$-aryl, for example:
diphenyl carbonate,
butylphenyl phenyl carbonate,
dibutyl phenyl carbonate,
isobutylphenyl phenyl carbonate,
diisobutyl phenyl carbonate,
tert.butylphenyl phenyl carbonate,
ditert.butyl phenyl carbonate,
n-pentylphenyl phenyl carbonate,
di(n-pentylphenyl)carbonate,
n-hexylphenyl phenyl carbonate,
di(n-hexylphenyl)carbonate,
cyclohexylphenyl phenyl carbonate,
dicyclohexyl phenyl carbonate,
phenylphenol phenyl carbonate,
diphenylphenol carbonate,
isooctylphenyl phenyl carbonate,
diisooctyl phenyl carbonate,
n-nonylphenyl phenyl carbonate,
di(n-nonylphenyl)carbonate,
cumylphenyl phenyl carbonate,
dicumyl phenyl carbonate,
naphthylphenyl phenyl carbonate,
dinaphthyl phenyl carbonate,
ditert.butylphenyl phenyl carbonate,
di(di-tert.butylphenyl)carbonate,
dicumylphenyl phenyl carbonate,
di(dicumylphenyl)carbonate,
4-phenoxyphenyl phenyl carbonate,
di(4-phenoxyphenyl)carbonate,
3-pentadecylphenyl phenyl carbonate,
di(3-pentadecylphenyl)carbonate,
tritylphenyl phenyl carbonate,
ditrityl phenyl carbonate,
preferably
diphenyl carbonate,
tert.butylphenyl phenyl carbonate,
ditert.butyl phenyl carbonate,
phenylphenol phenyl carbonate,
diphenylphenol carbonate,
cumylphenyl phenyl carbonate,
dicumyl phenyl carbonate,
particularly preferably diphenyl carbonate.
Diaryl carbonates may also be used containing residual amounts of their precursor monohydroxyaryl compounds. These amounts may be up to 20% preferably 10% particularly preferably 5% and very particularly preferably up to 2%. All percentages are given as percent by weight.

The diaryl carbonates are used in an amount of 1.02 to 1.30 mol, preferably 1.04 to 1.25 mol, particularly preferably 1.06 to 1.22 mol, very particularly preferably 1.06 to 1.20 mol per mol of Dihydroxyaryl compound.

Also mixtures of the above mentioned diaryl carbonates may be used.

In addition, the phenolic compounds used in the form of carbonates may also be used directly as monohydroxyaryl compounds simultaneously with one of the above-mentioned carbonates, in order to influence the end group of the oligocarbonate or polycarbonate. For this purpose such a monohydroxyaryl compound must be selected which possesses a boiling point above the boiling point of the monohydroxyaryl compound used as the precursor for the diaryl carbonate used in the process. Preferred mixtures are those with diphenyl carbonate. In the process according to the invention it is possible to add the monohydroxyaryl compound at any point in the reaction, at the beginning or during the reaction, preferably at the beginning of the reaction. Also the addition may be divided up into several portions. The content of free monohydroxyaryl compound may be 0.4 to 17 mol. %, preferably 1.3 to 8.6 mol. % (based on the dihydroxyaryl compound).

Ammonium catalysts or phosphonium catalysts are used for the synthesis according to the invention; for the purpose of this application, these are referred to collectively as onium compounds. They are used preferably in quantities of $10^{-8}$ to $10^{-3}$ mol, based on one mol dihydroxyaryl compound, particularly preferably in quantities of $10^{-7}$ to $10^{-4}$ mol.

Phosphonium salts may be used as catalysts for the production of the oligocarbonates according to the invention, optionally in combination with other suitable catalysts, such as, for example, other onium Phosphonium salts for the purpose of the invention are those corresponding to formula (IV),

wherein $R^{1-4}$ may be identical or different $C_1$–$C_{10}$-alkyls, $C_6$–$C_{10}$-aryls, $C_7$–$C_{10}$-aralkyls or $C_5$–$C_6$-cycloalkyls, preferably methyl or $C_6$–$C_{14}$-aryls, particularly preferably methyl or phenyl, and $X^-$ is an anion, such as hydroxide, sulfate, hydrogensulfate, hydrogencarbonate, carbonate, a halide, preferably chloride, or an alcoholate corresponding to the formula OR, wherein R can be $C_6$–$C_{14}$-aryl or $C_7$–$C_{12}$-aralkyl, preferably phenyl. Preferred catalysts are tetraphenylphosphonium chloride, tetraphenylphosphonium hydroxide, tetraphenylphosphonium phenolate, particularly preferably tetraphenylphosphonium phenolate.

Preferred quantities of phosphonium salt catalysts are $10^{-2}$ to $10^{-8}$ mol, preferably $10^{-3}$ to $10^{-8}$ per mol dihydroxyaryl compound and the most preferred quantities of catalysts are $10^{-4}$ to $10^{-6}$, very most preferred $10^{-4}$ to $10^{-7}$ mol per mol dihydroxyaryl compound. Other co-catalysts may optionally be used in addition to the phosphonium salt, in order to increase the rate of polymerization. These include salts of alkali metals and alkaline-earth metals, such as hydroxides, alkoxides and aryloxides of lithium, sodium and of potassium, preferably sodium hydroxide, sodium alkoxides or sodium aryloxides. Sodium hydroxide and sodium phenolate and sodium bisphenolate are most preferred. The quantities of the cocatalyst may be within the range of 1 to 2,000 ppb, preferably 5 to 1,000 ppb and most preferably 10 to 500 ppb, in each case calculated as sodium and referred to the amount of polycarbonate to be obtained.

The oligocarbonates may intentionally be branched by the use of small quantities (0.02 to 3.6 mol. %, based on the dihydroxyaryl compound) of branching agents. Suitable branching agents are the compounds which are suitable for polycarbonate production and which have three and more functional groups, preferably those which have three or more than three phenolic OH groups, for example, 1,1,1-tri (4-hydroxyphenyl)ethane and isatin biscresol.

The oligocarbonates obtained can be condensed in the known manner to form polycarbonates. Prior to the condensation, diaryl carbonates or dihydroxyaryl compounds may be admixed in order to correct the ratio of phenolic OH end groups to aryl carbonate end groups, so as to attain specifically the intended ratio of end groups in the final polycarbonate. The aryl carbonate end group may be partially modified by admixing substituted monohydroxyaryl compounds and optionally also their diaryl carbonates. Furthermore onium compounds like ammonium or phosphonium compounds or basic Alkali metal or Earth alkali metal salts could be admixed to enhance the speed of reaction.

Additionally the oligocarbonates could also be further condensed to the required molecular weights in the presence of other prepolymers or polymers to obtain Blends with certain and advantageous properties. For example the condensation in the presence of ABS are mentioned.

Auxiliary substances known for their utility in polycarbonate compositions and reinforcing agents may be admixed to the oligocarbonates according to the invention, prior to or after the synthesis, in order to modify the properties. These include heat stabilizers and UV stabilizers, flow-control agents, mold release agents, flameproofing agents, pigments, finely divided minerals, fibrous materials, for example, alkyl and aryl phosphites, alkyl and aryl phosphates, alkyl and aryl phosphanes, low-molecular carbonate esters, halogen compounds, salts, chalk, quartz powder, glass fibers and carbon fibers, pigments, and combinations of these. Such compounds are described, for example, in WO-A 99/55772, p. 15–25, and in "Plastics Additives", R. Gächter and H. Müller, Hanser Publishers, 1983, incorporated herein by reference.

EXAMPLE 94.7 kg/h of a melt mixture, consisting of 49.8 kg/h (232.7 mol/h) diphenyl carbonate and 44.9 kg/h (196.9 mol/h) bisphenol, with addition of 0.0034 kg/h (0.0079 mol/h) tetraphenylphosphonium phenolate dissolved in 0.1 kg/h phenol, was pumped from a receiver through a heat exchanger, heated to 190° C. and passed through a detention column. A detention column is a pipe into which perforated diaphragms are set at equal distances, so that chambers of equal volume are formed. A back-flow is avoided as a result of this arrangement. The average residence time is 45 minutes.

The melt was then passed, via an expansion valve, into a separator at a pressure of below 200 mbar. The melt flowing off was reheated to 190° C. in a falling-film evaporator, likewise at below 200 mbar, and collected in a receiver. After a residence time of 20 minutes, the melt was pumped into the three subsequent, similarly organised steps. The conditions in the second/third/fourth step were 80/50/25 mbar; 225/250/270° C. and 20/10/10 minutes. The oligomer formed had a relative viscosity of 1.068. The content of OH end groups was 0.69%. All vapors were passed via pressure controls into a column under vacuum and led away in the form of condensates.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A continuous process for producing oligocarbonate comprising in sequence the steps
    a) reacting a dihydroxyaryl compound with a diaryl carbonate in the presence of a catalyst to obtain a melt and avoiding removal of released monohydroxyaryl compound and
    b) withdrawing the monohydroxyaryl compound by flash evaporation and
    c) heating the melt obtained under vacuum in an evaporator equipped with sump receiver and
    d) repeating at least once steps b) and then c) each at gradually increased temperatures and lowered pressures.

2. A continuous process for producing oligocarbonate comprising in sequence the steps
    a) reacting a dihydroxyaryl compound with a diaryl carbonate in the presence of a catalyst to obtain a melt and avoiding removal of released monohydroxyaryl compound and
    b) withdrawing the monohydroxyaryl compound by flash evaporation and
    c) heating the melt obtained under vacuum in an evaporator equipped with sump receiver and
    d) repeating at least once steps b) and then c) each at gradually increased temperatures and lowered pressures, wherein step a) is carried out in a perforated-plate column and step b) is carried out in a centrifugal or baffle separator and step c) is carried out in falling film evaporator equipped with a sump receiver.

3. A continuous process for producing oligocarbonate comprising in sequence the steps
    a) reacting a dihydroxyaryl compound with a diaryl carbonate in the presence of a catalyst to obtain a melt and avoiding removal of released monohydroxyaryl compound and
    b) withdrawing the monohydroxyaryl compound by flash evaporation and
    c) heating the melt obtained under vacuum in an evaporator equipped with sump receiver and
    d) repeating at least once steps b) and then c) each at gradually increased temperatures and lowered pressures, said flash evaporation being separated hydraulically from the evaporator with sump receiver.

4. The process according to claim 2, wherein the centrifugal or baffle separator is separated hydraulically from the falling-film evaporator equipped with a sump receiver.

5. The process according to claim 2, wherein distribution of melt takes place above the falling-film evaporators in distributors which in view of fluid dynamics are free from dead spaces.

6. The process according to claim 2, wherein the falling-film evaporator contains pipes having diameters of 25 to 150 mm.

7. The process according to claim 6, wherein pipes have lengths of 4 to 20 m.

8. The process according to claim 6, wherein the pipes are spiral pipes.

9. A continuous process for producing oligocarbonate comprising in sequence the steps
   a) reacting a dihydroxyaryl compound with a diaryl carbonate in the presence of a catalyst to obtain a melt and avoiding removal of released monohydroxyaryl compound and
   b) withdrawing the monohydroxyaryl compound by flash evaporation and
   c) heating the melt obtained under vacuum in an evaporator equipped with sump receiver and
   d) repeating at least once steps b) and then c) each at gradually increased temperatures and lowered pressures, wherein steps b) and c) are repeated 2 to 6 times.

10. A method of using the oligocarbonate prepared by the process of claim 1 comprising producing polycarbonate.

* * * * *